(12) United States Patent
Righetti

(10) Patent No.: US 9,974,411 B2
(45) Date of Patent: May 22, 2018

(54) DEVICE FOR ORIENTING CAPSULES IN A BEVERAGE PRODUCING MACHINE

(71) Applicant: KONINKLIJKE PHILIPS N.V., Eindhoven (NL)

(72) Inventor: Marco Righetti, Eindhoven (NL)

(73) Assignee: SAGA COFFEE S.p.A., Gaggio Montano (IT)

(*) Notice: Subject to any disclaimer, the term of this patent is extended or adjusted under 35 U.S.C. 154(b) by 665 days.

(21) Appl. No.: 14/386,365

(22) PCT Filed: Mar. 15, 2013

(86) PCT No.: PCT/IB2013/052063
§ 371 (c)(1),
(2) Date: Sep. 19, 2014

(87) PCT Pub. No.: WO2013/144761
PCT Pub. Date: Oct. 3, 2013

(65) Prior Publication Data
US 2015/0040769 A1    Feb. 12, 2015

Related U.S. Application Data

(60) Provisional application No. 61/615,418, filed on Mar. 26, 2012.

(51) Int. Cl.
*B65G 47/14*  (2006.01)
*A47J 31/44*  (2006.01)
(Continued)

(52) U.S. Cl.
CPC ....... *A47J 31/4403* (2013.01); *A47J 31/3642* (2013.01); *A47J 31/407* (2013.01);
(Continued)

(58) Field of Classification Search
CPC ............ B65G 47/1428; B65G 47/1407; B65G 47/1442; B65G 47/1457; A47J 31/3633; A47J 31/3666; A47J 31/3676
(Continued)

(56) References Cited

U.S. PATENT DOCUMENTS 6,240,832 B1    6/2001  Schmed et al.
6,941,855 B2 *  9/2005  Denisart .............. A47J 31/3628
                                                      221/113
(Continued)

FOREIGN PATENT DOCUMENTS

WO    2013018066 A1    7/2013

*Primary Examiner* — Reginald L Alexander
(74) *Attorney, Agent, or Firm* — Dorsey & Whitney LLP

(57) ABSTRACT

A device (1) for orienting capsules (C) is described. The device comprises a container (9) for receiving randomly oriented capsules (C), which has bottom wall (11), provided with at least two apertures (17A, 17B). A rotor (13) is rotatingly arranged in the container and above the bottom wall (11). The rotor is provided with capsule receiving pockets (15). Under the apertures of the bottom wall (11), a capsule collector (19) is arranged, for receiving capsules discharged from the capsule receiving pockets (15) through either one or the other of the two apertures (17A, 17B). The capsule receiving pocket (15), the two apertures (17A, 17B) and the capsule collector (19) are shaped and arranged such that the capsules (C) randomly contained in the container (9) exit the capsule collector (19) with a pre-determined orientation.

19 Claims, 7 Drawing Sheets

(51) Int. Cl.
*A47J 31/36* (2006.01)
*A47J 31/40* (2006.01)
*B65D 83/00* (2006.01)

(52) U.S. Cl.
CPC ......... *B65D 83/00* (2013.01); *B65G 47/1428* (2013.01); *B65G 47/1442* (2013.01); *B65G 47/1457* (2013.01)

(58) Field of Classification Search
USPC ............ 99/289 R, 295, 289 P; 221/167, 169
See application file for complete search history.

(56) References Cited

U.S. PATENT DOCUMENTS

| | | | |
|---|---|---|---|
| 7,581,658 B2 | 9/2009 | Mosconi et al. | |
| 7,673,559 B2 * | 3/2010 | Zurcher | A47J 31/3642 99/289 R |
| 8,430,269 B2 * | 4/2013 | Nam | B65B 35/06 221/119 |
| 8,616,409 B2 * | 12/2013 | Young | B65G 47/1457 221/167 |
| 8,800,810 B2 * | 8/2014 | Magno | A47J 31/3642 221/123 |
| 2003/0145736 A1 * | 8/2003 | Green | A47J 31/3633 99/280 |
| 2006/0124659 A1 | 6/2006 | Mosconi et al. | |
| 2009/0250482 A1 | 10/2009 | Blanchino et al. | |

* cited by examiner

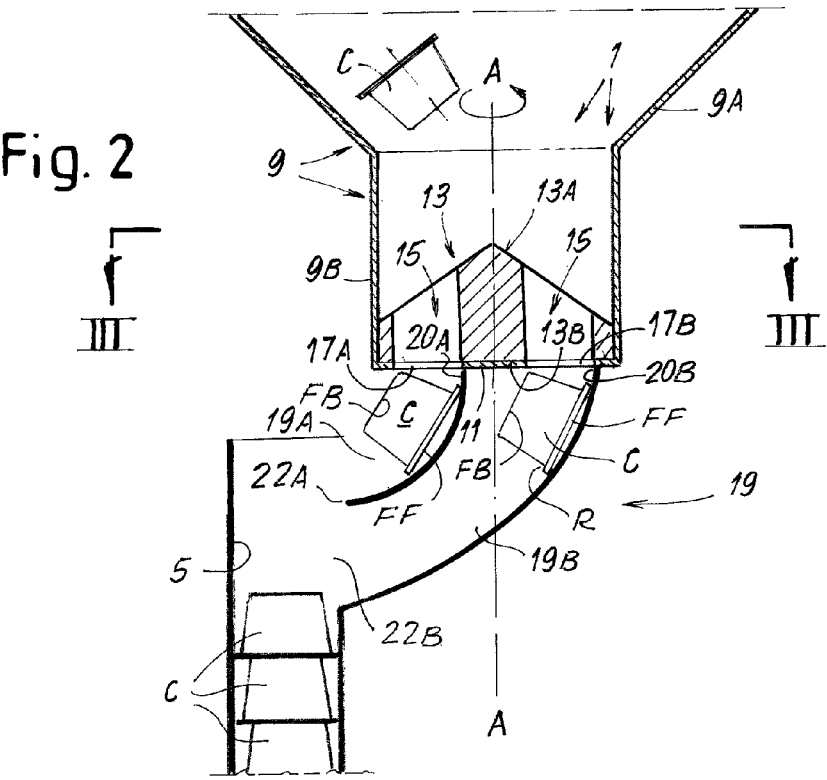
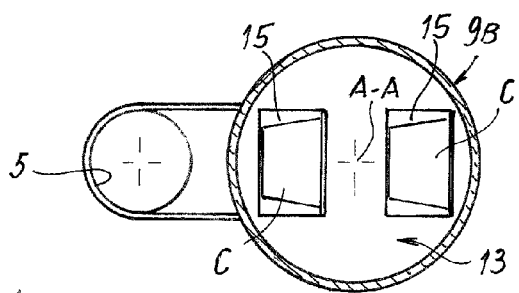
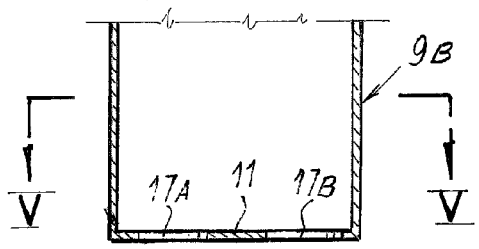
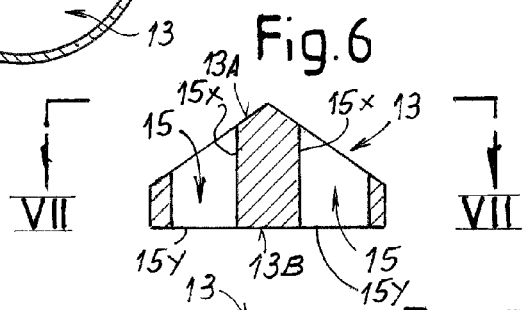
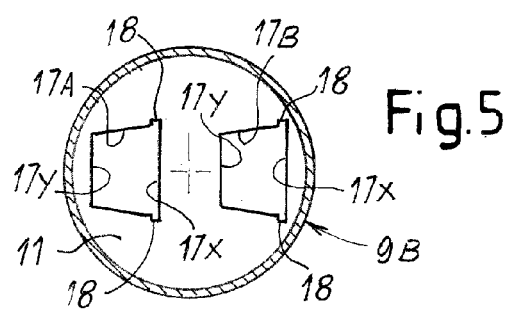
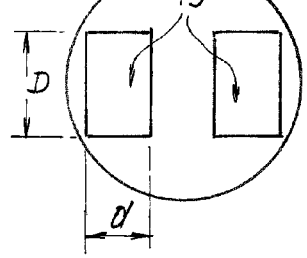

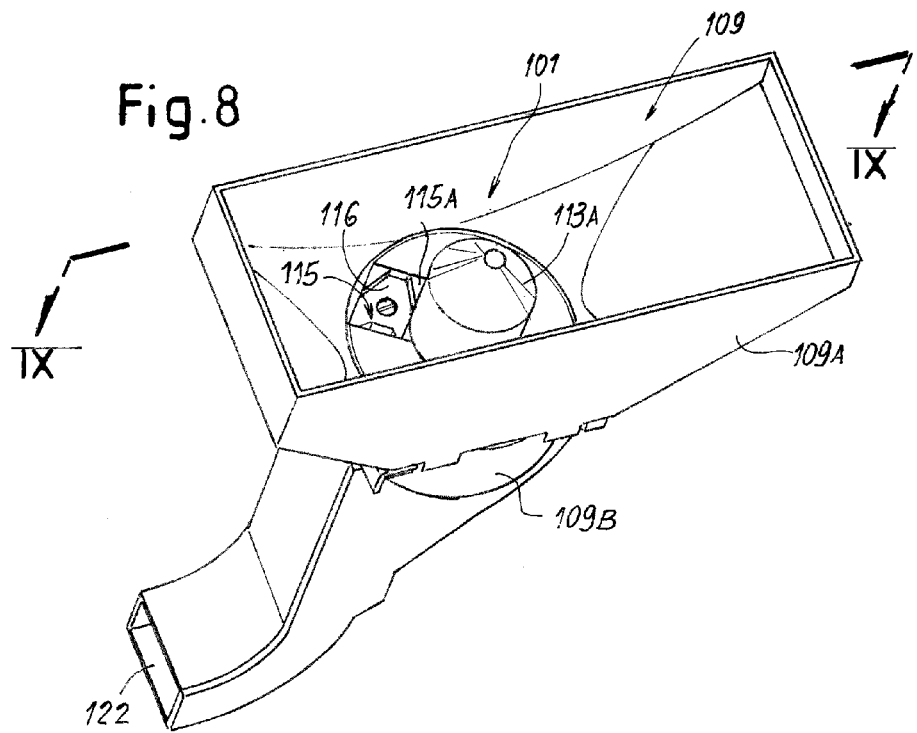
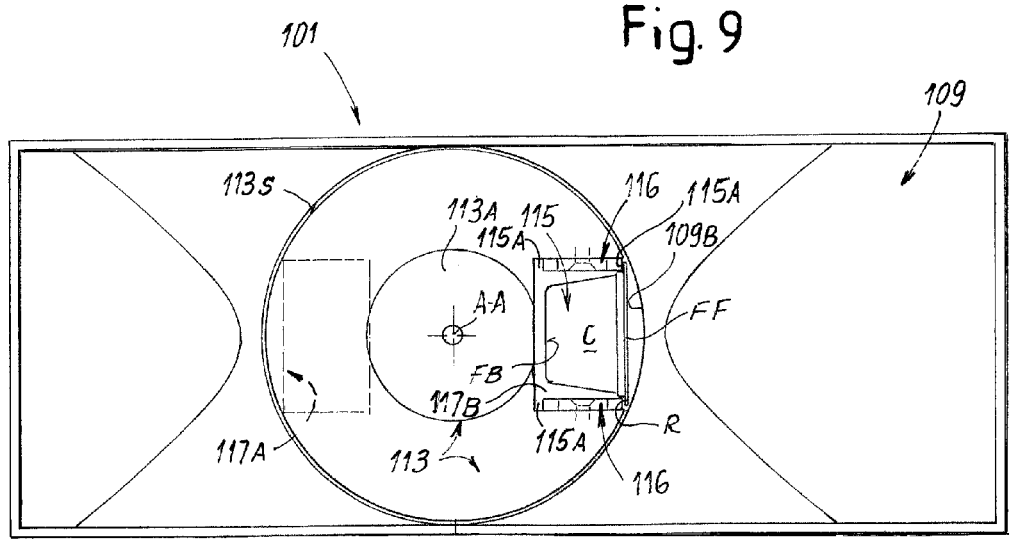

DEVICE FOR ORIENTING CAPSULES IN A BEVERAGE PRODUCING MACHINE

This application is the U.S. National Phase application under 35 U.S.C. § 371 of International Application No. PCT/IB2013/052063, filed on Mar. 15, 2013, which claims the benefit of U.S. Provisional Application No. 61/615,418 filed on Mar. 26, 2012. These applications are hereby incorporated by reference herein.

TECHNICAL FIELD

The present invention concerns the field of beverage producing machines and in particular, though not exclusively, the field of vending machines for producing beverages from single-serving capsules, pods or cartridges. More specifically, the present invention concerns improvements in devices for orienting and feeding capsules of pre-packaged beverage ingredients, to a beverage-preparing unit of a beverage producing machine.

BACKGROUND ART

Beverage producing machines, in particular but not exclusively coffee preparing machines are known which use capsules, pods or cartridges containing a predetermined amount of ingredients for the preparation of the beverage. In particular, coffee preparing machines are known, which use capsules or cartridges made of aluminium foil, plastic or the like, containing coffee powder from which a coffee beverage is extracted by means of pressurised hot water. The capsules are introduced individually in a brewing unit. The brewing unit usually comprises a brewing chamber in which the capsule is introduced. The brewing chamber is closed and hot pressurised water flows through the capsule to extract the flavours from the ingredients contained therein.

Usually the capsules are not symmetrical with respect to a plane orthogonal to the axis of the brewing chamber. They often have a front face and a back face differing from one another. The capsules must be introduced in the brewing unit in a correctly oriented position.

In household machines the capsules are often introduced one at a time by the user when a brewing cycle has to be performed. In some machines, and in particular in vending machines, a capsule storage or container is provided, in which a certain amount of capsules is stored, allowing then several brewing cycles to be performed without the need for introducing a new capsule each time.

U.S. Pat. No. 6,240,832 discloses a capsule feeding device for a brewing unit. The capsule feeding device comprises a capsule magazine in the form of a vertically extending tubular housing. A certain amount of pre-oriented capsules are arranged in the magazine such that they can be individually fed into the brewing unit when required.

Filling up the capsule magazine requires time, because the capsules must be introduced in a pre-determined oriented position. In vending machines a large amount of capsules must be charged in the magazine. This operation is time-consuming and therefore costly.

EP-A-1571951 discloses a capsule orienting and feeding apparatus which receives randomly oriented capsules from a magazine and properly orients the capsules individually such that the capsules can be fed in the properly oriented position towards a brewing unit arranged underneath the capsule orienting apparatus. This apparatus is particularly complex and expensive. The large number of mechanical components makes the device prone to failure.

US-A-2009/0250482 discloses a different automatic dispensing device for orienting capsules to be fed to a brewing unit. In this known device a container is provided, into which the capsules are randomly placed. The container rotates around an inclined axis and is provided with peripherally arranged slots. The slots are shaped such that capsules can fall through the slots only when they are properly oriented. The capsules exit the rotating container through the slots in the properly oriented position and fall into a channel from which they are fed to a brewing unit.

This known device, though simple, is not entirely reliable.

BRIEF DESCRIPTION OF THE INVENTION

The invention provides a novel device for orienting capsules, particularly for use in a beverage producing machine or the like, which overcomes one or more of the drawbacks of the known devices. More specifically, according to some embodiments the invention provides for a more efficient, less expensive and more reliable capsule orienting device.

In the context of the present disclosure, the term "capsule" shall be understood as encompassing any single-serving package, which are to be introduced in a beverage-preparing unit in a defined orientation.

According to some embodiments, the device for orienting capsules, comprises a container for receiving randomly oriented capsules, said container having a bottom wall with at least two apertures. A rotor is arranged in the container, above the bottom wall and rotates around a rotor axis. According to some embodiments, the rotor axis is preferably approximately orthogonal to the bottom wall of the container. The rotor is provided with at least one capsule receiving pocket. A capsule receiving pocket is an empty recess, aperture or volume provided in the rotor, in which the capsules can enter and through which the capsules can pass. The capsule receiving pocket has an inlet opening, facing the interior of the container, and an outlet opening facing the bottom wall, so that the capsules can enter (preferably one at a time, i.e. individually) the capsule receiving pocket through the inlet opening and exit the capsule receiving pocket through the outlet opening. The outlet opening of the capsule receiving pocket is arranged above and preferably adjacent the bottom wall of the container, so that a capsule entering the capsule receiving pocket is discharged through one or the other of the two apertures provided in the bottom wall of the container. Under the two apertures, a capsule collector can be arranged, for receiving capsules discharged from the capsule receiving pocket through either one or the other of the two apertures, respectively. The apertures and the capsule receiving pocket are shaped and arranged so that capsules are released from the capsule receiving pocket, through either one or the other of said two apertures, always with the same orientation.

In preferred embodiments, the capsule receiving pocket has a cross-sectional shape such that capsules can enter the capsule receiving pocket only with a pre-oriented axis, i.e. with the longitudinal axis of the capsule having a predetermined orientation with respect to the rotor axis. Preferably the arrangement is such that the longitudinal axis of the capsule entering the capsule receiving pocket is oriented approximately orthogonally to the rotor axis. "Approximately orthogonal" means that the orientation does not require to be orthogonal in a strict mathematical sense, but said orientation is rather substantially orthogonal, taking into account the necessary tolerances and clearances required for a correct operation of the device. For example the longitudinal axis of the capsule can be nearly radial with respect to the rotor axis.

If the rotor axis is oriented approximately vertically, the capsule receiving pocket has a shape such that the capsules will enter the pocket always with their longitudinal axes oriented approximately horizontally. This means that each capsule can enter the capsule receiving pocket in either one or the other of two possible alternative positions. If the capsule is tapered, it can enter the capsule receiving pocket either with the larger face or base or the smaller face or base of the capsule oriented towards the rotor axis, i.e. radially inwardly, and the other face or base facing radially outwardly. If the capsule has a rim around one of the two bases, it can enter the capsule receiving pocket either with the rim oriented towards the rotor axis or away from the rotor axis.

In particularly advantageous embodiments, the capsules are released from the capsule receiving pocket, through the respective aperture, in the capsule collector under the influence of gravity. Additional advancement means for promoting, assisting or facilitating the capsule movement are thus dispensed with, making the device simpler and more reliable.

In some embodiments the rotor has only one capsule receiving pocket. This results in a more compact rotor. In other embodiments two or more capsule receiving pockets can be provided.

In some embodiments the two apertures provided in the bottom wall of the capsule container have both the same shape. Moreover, the two apertures are advantageously located at the same distance from the rotor axis.

The shape of the two apertures corresponds to a longitudinal section of the capsules. "Longitudinal section" shall be understood as a section of the capsule along a plane containing the capsule axis, i.e. extending from a top face to a bottom face of the capsule. The edges surrounding each aperture are therefore shaped so that the capsules can pass there through only if oriented correctly. If the capsule is frustum-conical in shape, for example, the aperture will preferably be in the shape of an isosceles trapezium, having a larger base and a smaller base, the dimensions whereof correspond to the diameter of the larger face and of the smaller face of the capsules, respectively.

More specifically, in one embodiment, if the capsules have a tapered shape, for example a frustum-conical shape, the apertures will have a tapered shape, e.g. a trapezoidal shape. Advantageously one of said apertures will be tapering in a radially inwardly oriented direction with respect to said rotor axis and the other of said two apertures tapering in a radially outwardly oriented direction with respect to said rotor axis.

In some embodiments, each aperture has a first end edge and a second end edge, said first end edge and said second end edge having different lengths, the first end edge of one aperture being nearer to the rotor axis than the second end edge of said one aperture, and the second end edge of the other aperture being nearer to the rotor axis than the first end edge of said other aperture. The longer end edge can correspond to the larger base of a tapered capsule and/or to that base of the capsule which is surrounded by a rim.

In another embodiment, the capsules have a rim at one end. In such case, the apertures can have a pair of notches along one of the edges thereof, said notches forming the passage for the capsule rim. The edge provided with notches of one aperture is facing the rotor axis. The corresponding edge provided with notches of the other aperture is facing away from the rotor axis.

In further embodiments the capsules can be tapered, e.g. frustum-conical, as well as provided with a rim. The apertures will be shaped accordingly.

In all cases, due to the shape and orientation of the apertures (said apertures having the same orientation with respect to the rotor axis) the capsules can pass through the apertures only in one of the two possible opposite orientations which each capsule can take in the capsule receiving pocket(s) of the rotor.

Thus, the capsules will fall selectively through either one or the other of the two apertures, depending on their orientation in the capsule receiving pocket of the rotor. Selective passage through one or the other of the two apertures results in all the capsules entering the capsule collector with the same orientation.

In some embodiments the capsule receiving pocket of the rotor is provided with oppositely arranged pairs of guides or rim retention members, configured for retaining a rim of a capsule in either one or the other of two alternative positions, in which the capsule axis is approximately orthogonal to the rotor axis. The capsule is retained in this position and prevented from tilting when moving along and over one of the two apertures provided in the bottom wall of the container. The dimensions and positions of the two apertures are selected such that each capsule will be supported by the bottom wall when moving over one aperture and fall into the other aperture, losing support by the bottom wall. The capsule will fall in either one or the other of said apertures depending on whether the capsule rim is oriented towards the rotor axis or away from the rotor axis, i.e. depending upon which one of the two possible positions is taken by the capsule upon entering the capsule receiving pocket. As a result, all capsules will enter the apertures and pass there through in a univocally pre-defined orientation. In this embodiment orientation of the capsules is achieved by suitably positioning the capsule receiving pocket and the apertures one with respect to the others and to the rotor axis. This results in a particularly reliable operation of the device, preventing or avoiding the risk of capsules becoming blocked in the apertures.

In some embodiments a first pair of guides provided in the capsule receiving pocket is arranged nearer to the rotor axis and a second pair of guides is arranged more distant from the rotor axis. Moreover, the two apertures provided in the bottom wall of the capsule container are arranged at different distances from the rotor axis and can be advantageously dimensioned differently one from the other, and so that a capsule positioned in the capsule receiving pocket with the rim facing the rotor axis will be released in a first one of said two apertures, and a capsule positioned in the capsule receiving pocket with the rim facing away from the rotor axis will be released in a second one of said two apertures. Preferably the two apertures are arranged in two diametrically opposite positions around the rotor axis.

In some embodiments the capsule collector comprises two capsule unloading ducts, one for each aperture provided in the bottom wall. Each capsule unloading duct is provided with a respective duct inlet located under a respective one of said two apertures. Preferably, the capsule unloading ducts are configured and arranged such that oriented capsules are released under the influence of gravity from said at least one capsule receiving pocket through either one or the other of said two apertures in the corresponding capsule unloading duct. One of the capsule unloading ducts can be approximately vertically oriented. The other capsule unloading duct can be curved. A first one of said capsule unloading ducts can be straight and substantially vertical, while the second one of said capsule unloading ducts can be curved and extend from the respective inlet end arranged under the corresponding aperture, to the first capsule unloading duct and merge therein. The first capsule unloading duct can further extend towards a capsule collecting channel. The shape of the capsule unloading ducts and their arrangement with respect to the capsule collecting channel can be such that the capsules are unloaded in the unloading ducts with their axes oriented orthogonal to the longitudinal extension of the unloading ducts, and enter the capsule collecting channel with their axes oriented substantially parallel to the longitudinal extension of the capsule collecting channel. The latter can be oriented substantially vertically.

The cross-section of the capsule unloading ducts can be suitably shaped to prevent undesired tipping or tilting of the capsules moving there along.

In some embodiments, each capsule enters one or the other of two curved capsule unloading ducts so as to rotate by approximately 90° while moving from the duct inlet to the duct outlet.

In preferred embodiments the capsule collecting channel is approximately vertically oriented. The capsule collecting channel can form a capsule storage unit. The storage unit may be arranged so that one capsule at a time can be delivered to a beverage-preparing unit, such as a coffee brewing unit.

The invention also concerns a beverage producing machine or device comprising a beverage-preparing unit and a capsule orienting device as above described, for orienting and feeding capsules to the beverage-preparing unit.

According to a further aspect, a method for orienting capsules is provided, comprising: providing a container with a bottom wall and a rotor arranged to rotate around a rotor axis in said container, said rotor being provided with at least one capsule receiving pocket; randomly feeding capsules in said container; individually entering capsules in said at least one capsule receiving pocket; rotating said rotor and releasing said capsules from said at least one capsule receiving pocket through either one or the other of at least two apertures located in said bottom wall, preferably into a capsule collector, such that said capsules exit said apertures in a univocally oriented position.

Capsules are usually provided with a front or top face, a back or bottom face and a side wall extending between the front face and the back face. The capsules usually have an axis of symmetry. The front and back faces are broadly orthogonal to said axis. Usually the front and back faces are broadly circular and the side wall is broadly cylindrical or frustum conical, even though prismatic or frustum pyramidal capsules can also be envisaged. In some embodiments the capsule exits the capsule orienting device with the axis oriented broadly according to the final orientation which the capsule axis takes when entering the beverage-preparing unit. In some embodiments the device is arranged such that the capsules are unloaded in a capsule collecting channel with their axes broadly vertical or approximately vertical. Minor adjustments of the capsule axis along the trajectory from the upper position, where they are released by gravity in the capsule collecting channel, to the beverage-preparing unit are possible by simple interaction e.g. with the walls of the capsule collecting channel and/or of a storage area.

According to some embodiments, the method comprises the further step of rotating said capsules from a horizontal position, i.e. a position where their longitudinal axis is approximately horizontal, to a vertical position, i.e. a position where their longitudinal axis is approximately vertical, while travelling along a capsule collector. The capsule collector is shaped so that the capsules are rotated form horizontal to vertical while sliding along the capsule collector. Sliding is preferably by gravity. According to some embodiments, the method comprises the steps of sliding each capsule along a respective one of two capsule unloading ducts, each capsule unloading duct having a duct inlet located under a respective one of said two apertures and a duct outlet, arranged so that the capsules will finally enter a capsule collecting chamber with their axes rotated by 90° (e.g. from horizontal to vertical) with respect to the orientation taken by the capsules in the rotor.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 2 illustrates a sectional view of the orienting device in a first embodiment;

FIG. 3 illustrates a plan view of the capsule orienting device of FIG. 2;

FIG. 4 illustrates a section according to a vertical plane, orthogonal to the bottom wall, of the capsule container of the orienting device of FIGS. 2 and 3;

FIG. 5 illustrates a top plan view according to line V-V of FIG. 4;

FIG. 6 illustrates the rotor in a sectional view according to a vertical plane containing the rotor axis;

FIG. 7 illustrates a top view according to line VII-VII of FIG. 6;

FIG. 8 illustrates a perspective view of a capsule orienting device according to a further embodiment;

FIG. 9 illustrates a top plan view according to line IX-IX of FIG. 8;

DETAILED DESCRIPTION OF AN EMBODIMENT OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

A first embodiment of a capsule orienting device according to the subject matter of the present disclosure is described below reference being made to FIGS. 1 to 8.

Figure 1:
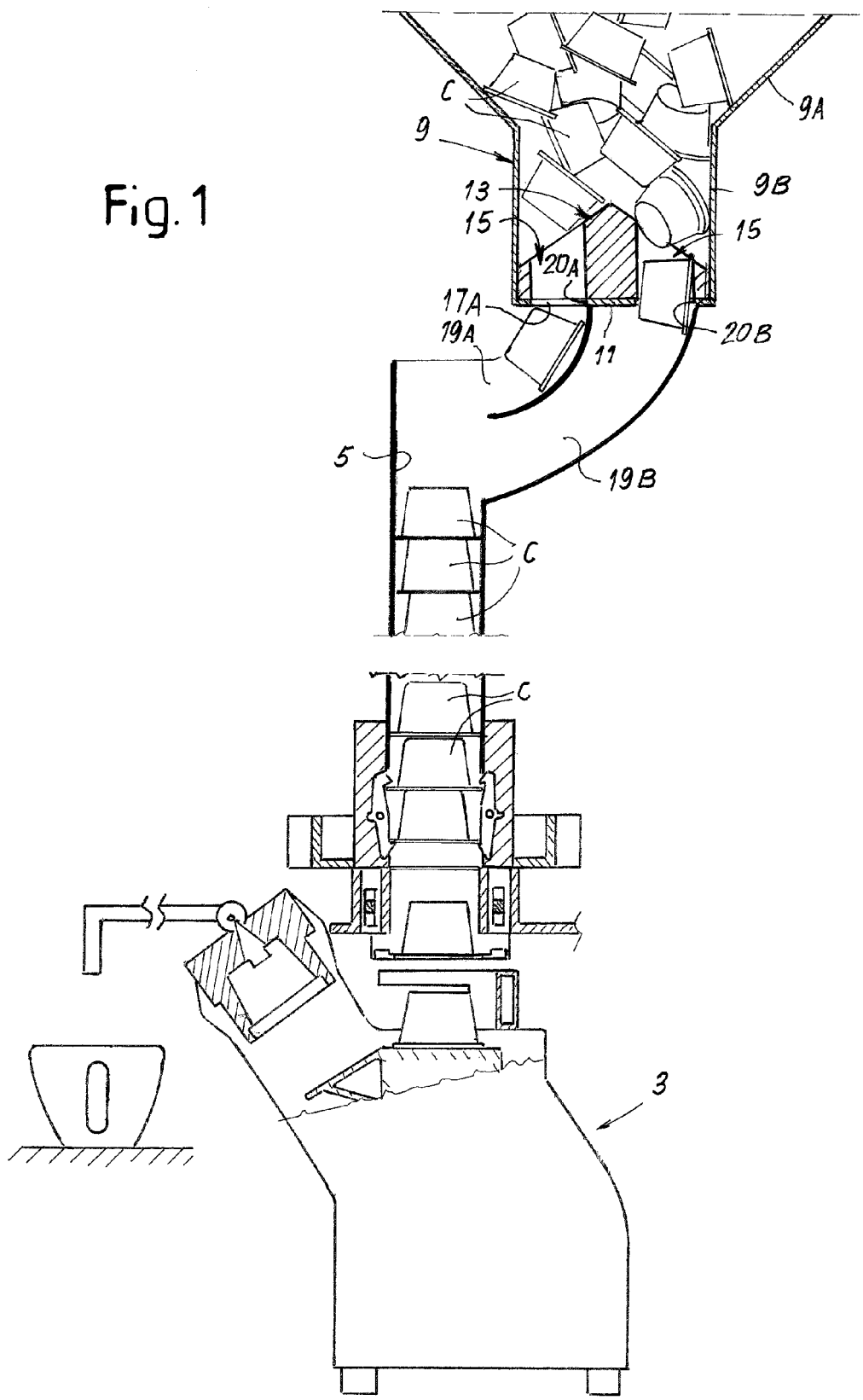
FIG. 1 illustrates a side and partial cross-sectional view of the capsule orienting and feeding device in combination with a brewing unit.

FIG. 1 illustrates a capsule orienting device in combination with a beverage-preparing unit, such as e.g. a coffee brewing unit. The capsule orienting device and the brewing unit can be arranged in a vending machine, for example, or a different beverage producing machine. In the following description reference will specifically be made to capsules for the production of coffee-based beverages, but it should be understood that the invention can be used also for handling capsules containing different kinds of ingredients, for the production of different, either cold or hot beverages. The ingredients can be suitable for extraction with hot water, either pressurised or not, such as in particular coffee powder, or ingredients which are soluble in hot or cold water, or concentrated ingredients which must be diluted with hot or cold water, or any other kind of edible product which is packaged in single-serving packages and individually introduced in a beverage-preparing unit.

The capsules can be single-dose or multi-dose capsules and can be made of any suitable material, such as plastic, aluminium foil or the like. The capsules can be sealed and introduced in a beverage-preparing unit which is provided with perforating or aperturing devices arranged to perforate both the top and the bottom side of the capsule. In other embodiments, the capsules can be sealed on one side and liquid-pervious on the other and require only one perforating or aperturing device. In yet further embodiments the capsules can be water-pervious on both sides, such that no aperturing, puncturing or perforating devices are required in the beverage-preparing unit.

The capsule orienting device is designated 1 as a whole and is arranged above a brewing unit 3. The brewing unit 3 represented in FIG. 1 is similar to the brewing unit disclosed in U.S. Pat. No. 6,240,832. It should, however, be understood that the brewing unit can be different from the one shown in the drawings. A different beverage-preparing unit can also be envisaged.

Between the capsule orienting device 1 and the brewing unit 3 a capsule collecting channel 5 is arranged, wherein the capsules C are delivered in an oriented manner by the capsule orienting device 1. The capsules collected in the capsule collecting channel 5 are all oriented in the same way. In the embodiment shown in the drawings the capsules C are frustum shaped, with a front face or top face FF and a back face or bottom face FB. A flange or rim FL extends circumferentially around the front face FF. The side surface of the capsules between the front face FF and the back face FB has the shape of a truncated cone. B-B indicates the capsule axis. The shape of the capsule can be different from the one specifically shown in the drawings for illustrative purposes only. What is important is only that the capsule must be oriented, i.e. it has a front face and a back face which differ from one another.

The capsule orienting device 1 comprises a container 9, which is preferably stationary with respect to the structure of the beverage producing machine. The container 9 receives the capsules C in a randomly oriented, i.e. in a non-oriented manner. The container 9 can have a roughly cylindrical shape or a more complex shape, such as a frustum conical portion 9A and a cylindrical bottom portion 9B, with a circular cross-section. The container 9 has a bottom wall 11. A rotor 13 is rotatingly arranged in the container 9 above the bottom wall 11. The rotor 13 has a rotor axis A-A, which is preferably approximately orthogonal to the bottom wall 11 of the container 9 and around which the rotor is caused to rotate by a mover, e.g. an electric motor, not shown.

In some embodiments, as disclosed in the attached drawings, the rotor 13 has a conical upper surface 13A and a substantially planar bottom surface 13B, arranged adjacent to the bottom wall 11 of container 9. Stirring blades or projections (not shown) can be provided in the upper part of the rotor 13, for preventing the capsules from remaining stuck in the container 9.

The rotor 13 is provided with at least one capsule receiving pocket 15. In the exemplary embodiment shown in the drawings, the rotor 13 comprises two capsule receiving pockets 15. The two capsule receiving pockets 15 are arranged in two opposite positions with respect to the rotor axis A-A, i.e. they are angularly shifted by 180°. The number of capsule receiving pockets can be different, for example depending upon the dimension of the rotor 13 and/or upon the dimension of the capsules C. Each capsule receiving pocket 15 has an inlet opening (15X, see FIG. 6) facing the interior of the container 9, and an outlet opening (15Y, see FIG. 6) facing the bottom wall 11 of the container 9, so that capsules entering the capsule receiving pocket 15 through the inlet opening can exit the capsule receiving pocket through the outlet opening. The movement trough the capsule receiving pocket is preferably by gravity.

The capsule receiving pockets 15 have a shape such that the capsules C can enter the capsule receiving pockets in a pre-oriented manner. More specifically, in the embodiment disclosed, the capsules can enter the capsule receiving pockets only with the longitudinal axis of the capsule approximately horizontal, i.e. approximately orthogonal to the rotor axis A-A. The shape of the cross-section of the capsule receiving pockets 15 depends upon the shape of the capsules C. In the example shown in the drawings the capsules C are broadly frustum conical and the larger diameter, i.e. diameter of the front face FF, is larger than the height of the capsule, i.e. the distance between the front face FF and the back face FB. The capsule receiving pockets 15 have a substantially rectangular cross-section, with a larger dimension D corresponding or slightly exceeding the diameter of the front face FF and a smaller dimension d substantially corresponding to or slightly greater than the height of the capsule. The capsule receiving pockets 15 are oriented with respect to the body of the rotor 13 so that the capsules C will enter the respective pocket 15 with the axis thereof orthogonal to the rotor axis A-A. The capsules C will therefore enter the capsule receiving pockets 15 in a horizontal position. Differently positioned capsules will be prevented from entering the capsule receiving pockets 15 due to the very geometry and dimension of the capsules and the capsule receiving pockets 15.

The bottom wall 11 of the container 9 is provided with at least two apertures, labeled 17A and 17B. As can be clearly see in FIG. 5, each aperture 17A, 17B has a shape corresponding to a longitudinal section of the capsules. The "longitudinal section" is the section of the capsule according to a plane containing the axis of the capsule and orthogonal to the front face and back face FF and FB of the capsule.

In the exemplary embodiment disclosed herein, since the capsules are substantially frustum shaped, the apertures 17A and 17B are broadly in the form of an isosceles trapezium, the base whereof has a length substantially corresponding to the diameter of the back face FB of the capsules C. The larger base of the trapezium forming the respective aperture 17A, 17B is slightly larger than the diameter of the front face FF, due to the presence of two side indentations 18, the extension whereof is sufficient to allow the passage of the capsule rim FL there through. Stating it differently, each aperture 17A, 17B has a first end edge 17X and a second end edge 17Y, said first end edge and said second end edge having different dimensions from one another, the first end edge 17X of one aperture (17A) being nearer to the rotor axis A-A than the second end edge 17Y of said one aperture (17A), and the second end edge 17Y of the other aperture (17B) being nearer to the rotor axis A-A than the first end edge 17X of said other aperture (17B).

Each capsule C can pass through either one or the other of the two apertures 17A and 17B only in one of the two possible horizontal orientations which the capsules can take when entering the respective capsule receiving pocket 15 of the rotor 13. Looking at FIG. 2, the capsules C can pass through the apertures 17A, 17B only when they are oriented with the front face (i.e. the larger face surrounded by a capsule rim R) facing on the right, and the back face facing on the left.

Each aperture 17A, 17B is arranged at the respective inlet of a respective capsule unloading duct 19A, 19B forming part of a capsule collector 19. The two capsule unloading ducts 19A, 19B extend from a respective duct inlet 20A and 20B to a respective duct outlet 22A and 22B.

Each capsule unloading duct 19A, 19B is curved such that each capsule C entering a respective one of said two capsule unloading ducts 19A, 19B will rotate around 90° when moving from the duct inlet 20A, 20B towards the duct outlet 22A, 22B. Therefore, each capsule moving along the capsule unloading duct 19A, 19B will exit the respective capsule unloading duct in a substantially vertical orientation, i.e. with the capsule axis oriented vertically and will enter the capsule collecting channel 5.

The shape and inclination of the capsule unloading ducts 19A and 19B is such that the capsules C can slide there along by gravity, without the need for additional conveying means.

The two duct outlets 22A and 22B are preferably placed one above the other on one side of the capsule collecting channel 5.

The capsule orienting device 1 described so far operates as follows. When capsules C are required to be discharged in the capsule collecting channel 5, the rotor 13 starts rotating around the rotor axis A-A. During rotation single capsules C randomly contained in container 9 will fall in the capsule receiving pockets 15. As mentioned above, the cross-section of the capsule receiving pockets 15 is such that the capsules C can enter the capsule receiving pockets 15 only with the capsule axis oriented substantially horizontally, i.e. orthogonal to the rotor axis A-A. Each capsule C can therefore take two possible positions inside the capsule receiving pocket 15: Either with the front face FF facing radially inwardly, i.e. towards the rotor axis A-A and the back face FB facing radially outwardly, or in the opposite position, namely with the front face FF facing radially outwardly and the back face FB facing radially inwardly, towards the rotor axis A-A.

These two alternative possible positions correspond to the two orientations of the apertures 17A and 17B provided in the bottom wall 11 of the capsule container 9.

Consequently, during rotation of the rotor 13, a capsule oriented with the front face FF facing the rotor axis A-A will be able to pass through aperture 17A, but will be prevented from exiting the container 9 through the aperture 17B. Conversely, a capsule oriented with the back face FB facing the rotor axis A-A will be prevented from exiting the container 9 through the aperture 17A, but will be able to pass through the aperture 17B.

Consequently, the capsules C will all exit the container 9 in one and the same orientation.

Depending upon the apertures 17A, 17B where through the capsule passed, the latter will slide along one or the other of the two capsule unloading ducts 19A and 19B of the capsule collector 19, and will reach the capsule collecting channel 5. Each capsule C will be unloaded in the capsule collecting channel 5 with the capsule axis oriented vertically and the front face FF oriented downwardly.

If an opposite capsule orientation is desired, i.e. if the capsules C shall be collected in the capsule collecting channel 5 with the front face FF facing upwardly, it will suffice rotating the bottom wall 11 by 180° around the rotor axis A-A, so that the larger basis of the trapezium-shaped apertures 17A and 17B (i.e. the edge 17X) will be oriented in the opposite direction with respect to the one shown in the drawings. In that case, the capsules C will be downloaded in the capsule collecting channel 5 with the front face FF facing upwardly.

FIGS. 8 to 16 illustrate a second embodiment of a the capsule orienting device. According to this embodiment the capsule orienting device, designated 101, comprises a capsule container 109 with a bottom surface or bottom wall 111. A rotor 113 is rotatingly arranged in the container 109. A-A indicates the rotor axis, i.e. the geometrical axis of the rotor 113, around which said rotor 113 rotates.

In this embodiment a rotor 113 provided with only one capsule receiving pocket 115 is shown. The capsule receiving pocket 115 has a broadly rectangular cross-section but is open laterally, i.e. the capsule receiving pocket 115 forms an interruption along a substantially cylindrical side surface 113S of the rotor 113.

The capsule receiving pocket 115 has an inlet opening (115X, see FIGS. 12A, 12B) facing the interior of the container 109, and an outlet opening (115Y, see FIG. 12A, 12B) facing the bottom wall 111 of the container 109, so that capsules C entering the capsule receiving pocket 115 through the inlet opening can exit the capsule receiving pocket through the outlet opening. The movement trough the capsule receiving pocket is preferably by gravity.

Inside the capsule receiving pocket 115 two guides are formed on both sides of the capsule receiving pockets. In the embodiment shown in the drawings, each pair of guides is formed by a shaped plate 116 connected to the respective side wall 115A of the capsule receiving pocket 115. Each plate 116 is provided with two inclined edges 116A developing substantially symmetrically along a plane P of symmetry of the respective plate 116. Each inclined edge 116A merges in a vertical edge 116B. The edges 116A, 116B on each side of each plate 116 form a respective guide engaging the rim R of each capsule C which enters the capsule receiving pockets 115, as will became clearer from the following description.

In other embodiments, not shown, the guides and the edges 116A, 116B can be integrally formed with the body of the rotor 113, rather than by plates connected to the side walls 115A of the pocket 115 provided in the rotor 113.

In some embodiments, the capsule container 109 can be formed by two portions connected to one another. For example an upper portion of the capsule container 109 is formed in the shape of a hopper 109A and is connected to a substantially cylindrical lower portion 109B of the container 109. The lower portion 109B of the container 109 houses the cylindrical body of the rotor 113. The rotor 113 is in turn provided with a central shaft 113A extending vertically along at least part of the hopper portion 109A of the capsule container 109. The central shaft 113A can be shaped as an agitator, or an agitator can be connected to the central shaft. The agitator facilitates the movement of the capsules C towards the capsule receiving pocket 115 during rotation of the rotor 113.

Figure 10:
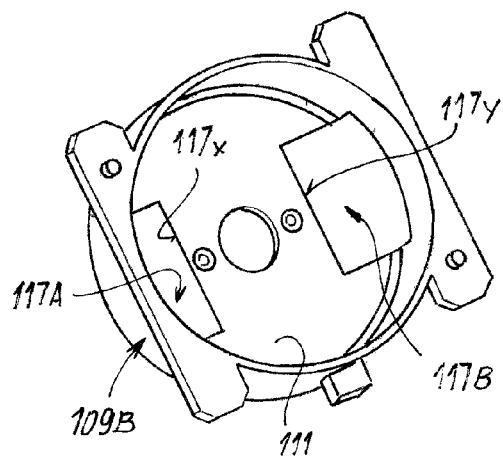
FIGS. 10 and 11 illustrate perspective views from the top and from the bottom of the lower portion of the capsule container of the orienting device shown in FIGS. 8 and 9.
Figure 11:
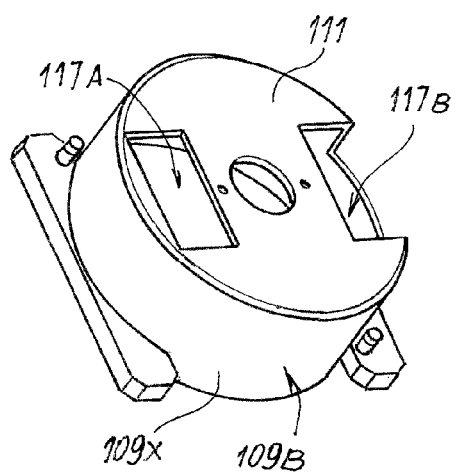
Figure 12:
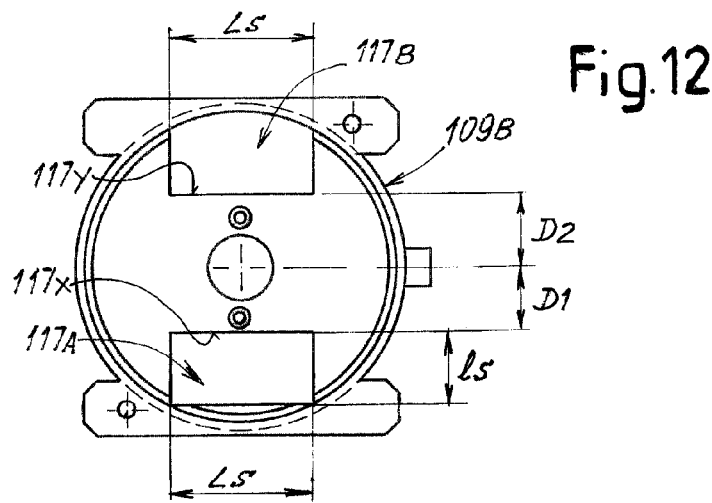
FIG. 12 illustrates a top plan view the lower portion of the capsule container, according to a sectional plane orthogonal to the bottom wall of the capsule container.
Figure 12A:
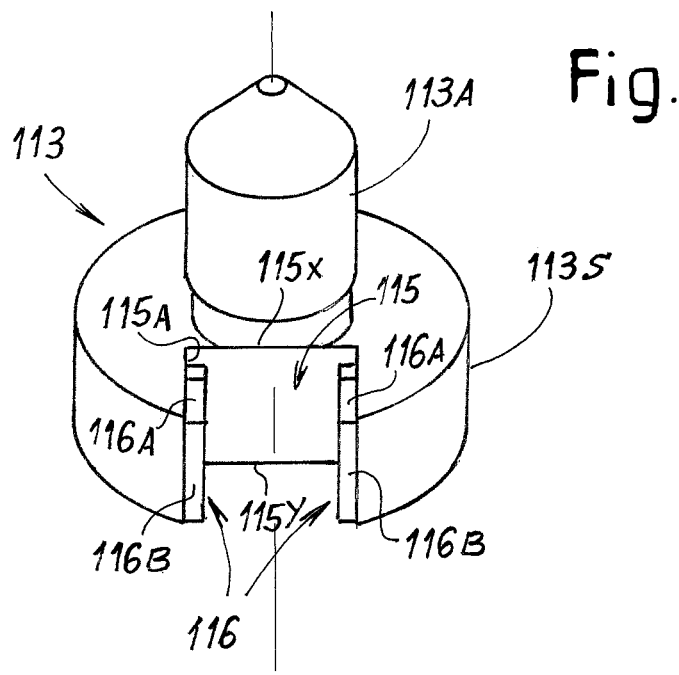
FIGS. 12A and 12B illustrate perspective views of the rotor of FIGS. 8 to 12.
Figure 12B:
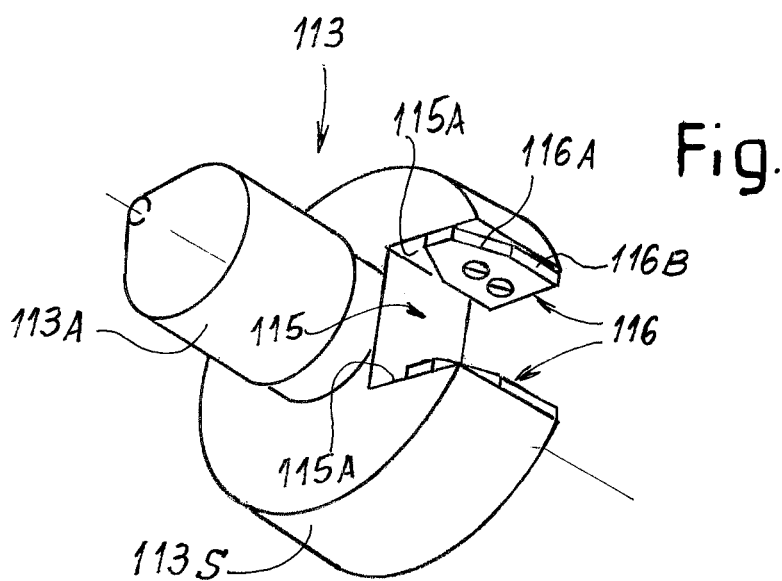

The lower substantially cylindrical portion 109B of the capsule container 109 is shown in isolation in FIGS. 10, 11 and 12. As can be appreciated from these figures, the bottom wall 111 of the container 109 formed by the lower part 109B is provided with a first aperture 117A and a second aperture 117B. The first aperture 117A has a rectangular shape, with a longer side and a shorter side. In FIG. 11 Ls indicates the length of the longer side and is indicates the length of the shorter side of the rectangular aperture 117A. The distance between the first aperture 117A and the rotor axis A-A is indicated with D1. The distance D1 is understood as the distance between the rotor axis A-A and the edge 117X of aperture 117A which is nearest to the rotor axis A-A.

The second aperture 117B is located further away from the rotor axis A-A and extends not only along the bottom wall 111 of the lower portion 109B of the container 109, but also along the side wall 109X of the latter. The aperture 117B is therefore partly rectangular and partly cylindrical extending along the bottom and the side wall of the lower portion 109B of the container 109. The width of the aperture 117B is again indicated as Ls and the distance of the aperture 117B from the rotor axis A-A is designate D2, said distance being again understood as the distance between the rotor axis A-A and the edge 117Y of the aperture 117B which is nearest to the rotor axis A-A.

Under the bottom wall 111 of the container 109 a capsule collector 119 is arranged. In the embodiment illustrated in the drawing, the capsule collector 109 comprises a first capsule unloading duct 119A and a second capsule unloading duct 119B. The first capsule unloading duct 119A extends downwards from a duct inlet 120A arranged under the first aperture 117A. In the illustrated embodiment the unloading duct 119A is substantially straight and extends along a substantially vertical direction. Different shapes and orientations of the unloading duct 119A are possible. Preferably, the shape and orientation of the unloading duct 119A are such that capsules can slide along the unloading duct under the effect of gravity. The cross-section of the unloading duct 119A is shaped so that the capsules C sliding along the duct unloading duct 119A will not accidentally rotate, but will translate along said unloading duct 119A.

The second capsule unloading duct 119B extends from a duct inlet 120B, arranged under the second aperture 117B, downwards in a somewhat curved shape. The cross section and the curvature of the unloading duct 119B are such that capsules entering the unloading duct 119B at the duct inlet 120B will slide, preferably under the sole action of gravity, and reach the point where the unloading duct 119B merges with the unloading duct 119A. In this manner the capsules C will enter a final capsule conveying duct 122. Said final capsule conveying duct is curved such that at the end thereof the capsules C will be oriented with their axes B-B in a substantially vertical position and with the front face FF surrounded by the rim R facing downwards. The cross section of the final capsule conveying duct 122 is rectangular and dimensioned so that the capsules will move there along without tilting or rotating accidentally. The capsule conveying duct 122 can be connected to a capsule collecting channel as shown in FIG. 1 and labeled 5 therein, which extends vertically towards a brewing unit 3 or the like.

The rotor 113 is rotated by means of an electric motor 121 or any other suitable mover, for example through a shaft 123 connected to the motor 121 through a motor reducer.

The device disclosed so far operates as follows.

Capsules C are randomly loaded in the container 109. The hopper-shaped upper portion 109A of the container 109 and the rotation of the rotor 113 facilitate the movement of the capsules by gravity towards the bottom of the container 109. During rotation of the rotor 113, one capsule C at a time can enter the capsule receiving pocket 115 provided in the rotor 113. As can be seen in FIGS. 3-16, a capsule C can enter the pocket 115 in either one or the other of two alternative positions. In both positions the capsule C is arranged with the capsule axis (labeled B-B) in a substantially horizontal position, i.e. substantially orthogonal to the rotor axis A-A. Each capsule C is provided with a capsule rim R surrounding the top face or front face FF of the capsule C. The rim R of the capsule C received in the pocket 115 will be guided along one or the other of the two symmetrically arranged edges 116A, 116B provided on the plates 116 fixed on the two sides 115A of the capsule receiving pocket 115. As can be seen in FIGS. 13-16, irrespective of the orientation taken by the capsule C in the pocket 115, the capsule rim R will always be retained in the guides formed by the plates 116 in a substantially vertical plane.

While the rotor 113 rotates, the pocket 115 will move along the bottom wall 111 of the container 109 and will pass over both apertures 117A and 117B. The capsule C received in the capsule receiving pocket 115 will fall in either one or the other of the two apertures 117A and 117B depending on the position taken by the capsule C in the capsule receiving pocket 115B.

Figure 14:
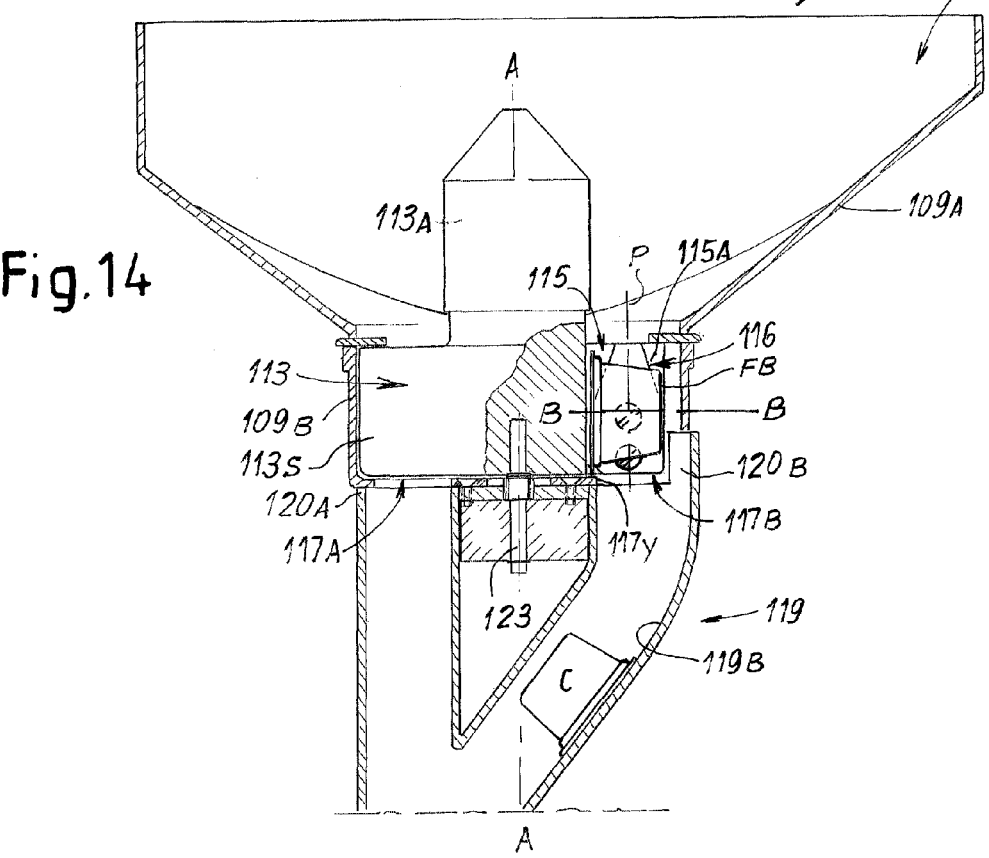
Figure 15:
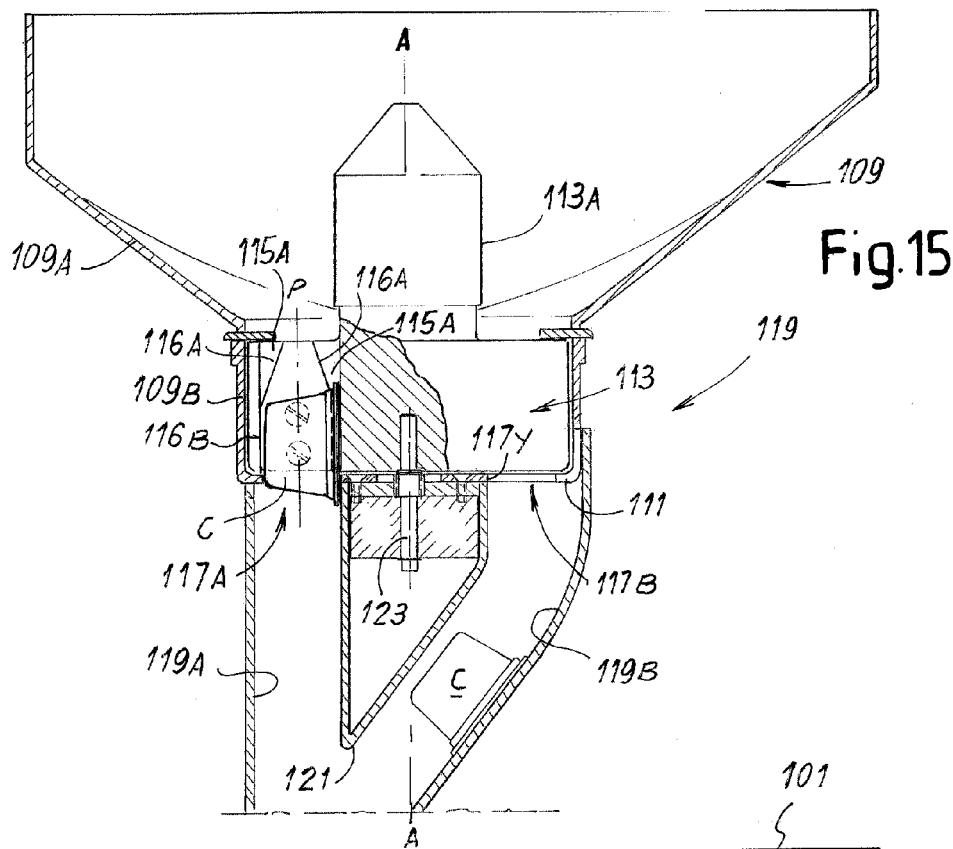

In the positions shown in FIGS. 14 and 15, the capsule C is oriented with the rim R facing the rotor axis A-A. The capsule C arranged in this position will not fall through the aperture 117B, because the position of the edge 117Y of the aperture 117B, i.e. the distance D2 thereof from the rotor axis A-A, is such that the rim R of the capsule C will rest on the bottom wall 111 of the container 109 and will be supported during movement of the capsule receiving pocket 115 over the aperture 117B. This can best be seen in FIG. 14. The guides formed by the plates 116 prevent the capsule C from tipping or tilting into the aperture 117B.

Figure 13:
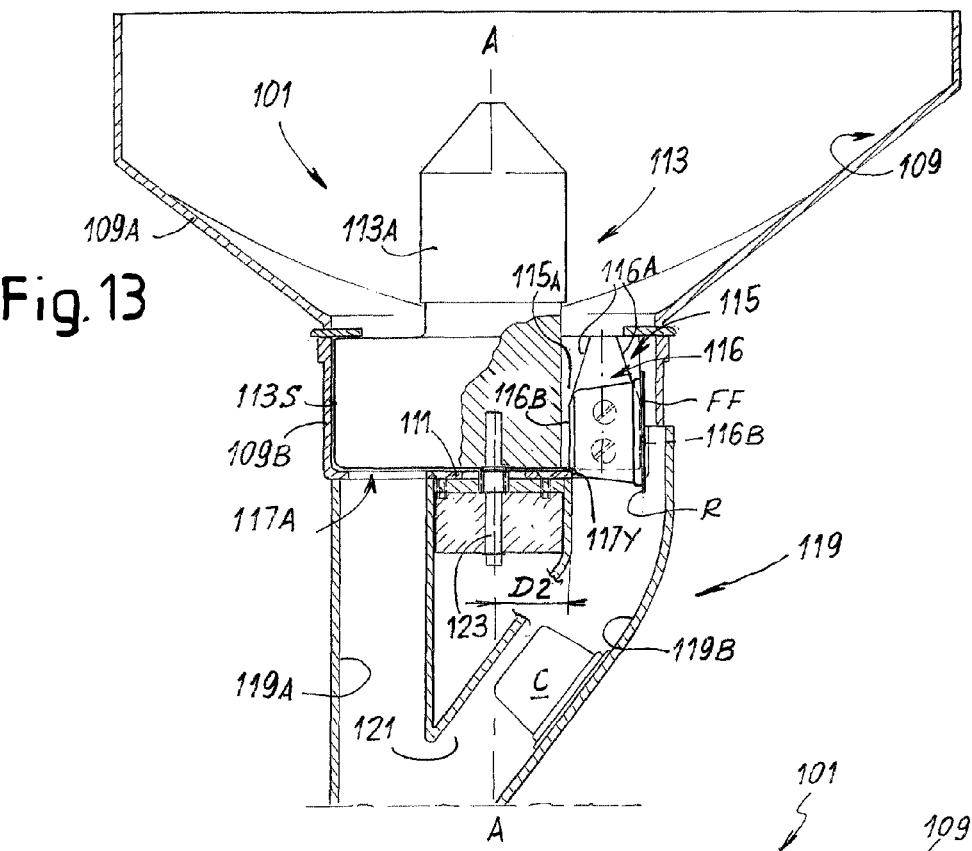
FIGS. 13 to 16 illustrate a longitudinal section of the capsule orienting device shown in FIGS. 8 to 12 in four different operating conditions.

When the capsule receiving pocket 115 travels over the aperture 117A and reaches the position shown in FIG. 13, due to the dimension and position of said aperture, the capsule rim R will lose its support by the bottom wall 111 and the capsule C will fall into the capsule unloading duct 119A moving through the aperture 117A.

Figure 16:
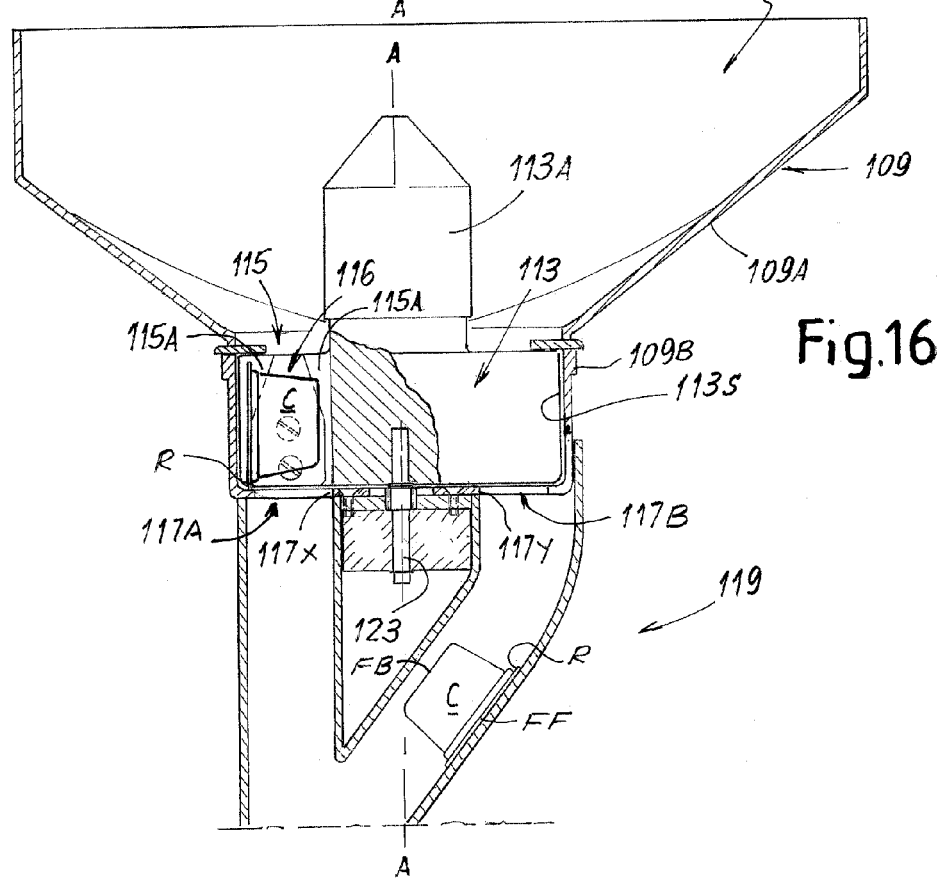

As shown in FIGS. 15 and 16, conversely, when the capsule C enters the capsule receiving pocket 115 with the rim R facing radially outwardly, i.e. opposite the rotor axis A-A, the capsule C will be prevented from falling into aperture 117A (FIG. 16), because the rim R is supported by the bottom wall 111 when the capsule receiving pocket 115 moves over the aperture 117A. When the capsule receiving pocket 115 moves over the aperture 117B, conversely, the rim R will lose contact with the bottom wall 111, since the aperture 117B extends beyond the bottom wall 111 and interrupts the side wall 109X of the lower portion 109B of the container 109. Consequently, the capsule will now fall through aperture 117B into the capsule unloading duct 119B.

As can be understood from the above description, each capsule C will always enter the guiding channel 122 in a pre-defined orientation, irrespective of the position taken by the capsule when entering the capsule receiving pocket 115 of the rotor 113. In any event, the capsule C will exit the channel 120 with the top face FF surrounded by the rim R facing downwardly and the bottom face FB, opposite the rim R, facing upwards and will be introduced in the collecting channel 5 with the orientation shown in FIG. 1.

If the brewing unit 3 located at the end of the capsule collecting channel 5 requires the capsules to be oriented in the opposite way, i.e. with the rim R facing upwards and the bottom face FB oriented downwards, it will be sufficient to rotate the bottom part 109B of the container 109 and exchange the position of the two apertures 117A, 117B.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device for orienting capsules, comprising:
   a container for receiving randomly oriented capsules, said container having a bottom wall with at least two apertures;
   a rotor arranged in said container above said bottom wall and rotating around a rotor axis, said rotor having at least one capsule receiving pocket rotating therewith and moving along the bottom wall, the receiving pocket having an inlet opening and an outlet opening, said capsules entering said capsule receiving pocket through said inlet opening and exiting said capsule receiving pocket through said outlet opening;
   a capsule collector arranged under the two apertures for receiving capsules discharged from the capsule receiving pocket through either one or the other of the two apertures;
   wherein said at least one capsule receiving pocket and said two apertures are shaped and arranged such that the capsules randomly contained in said container fall from the capsule receiving pocket selectively through either one or the other of the two apertures and exit therethrough, depending on their orientation in the capsule receiving pocket, selective passage through one or the other of the two apertures resulting in all the capsules entering the capsule collector with the same orientation;
   wherein one of said at least two apertures is tapered in a radially inward oriented direction with respect to said rotor axis, and another of said at least two apertures is tapered in a radially outward oriented direction with respect to said rotor axis; and
   wherein said at least two apertures are configured to allow the capsules to pass across said apertures in only one of two possible horizontal orientations which the capsules can take up in said at least one pocket, so that all capsules exiting said apertures will have the same orientation.

2. Device according to claim 1, wherein said at least one capsule receiving pocket has a cross-sectional shape such that capsules can enter the capsule receiving pocket only with a longitudinal capsule axis pre-oriented, with respect to the rotor axis.

3. Device according to claim 1, wherein the cross-sectional shape of said capsule receiving pocket is such that the capsules can enter said capsule receiving pocket only with a longitudinal capsule axis oriented approximately orthogonal to the rotor axis.

4. Device according to claim 1, wherein said two apertures are configured to allow the capsules to pass across said apertures in only one of two possible orientations which the capsules can take up in said at least one pocket, so that all capsules exiting said apertures will have the same orientation.

5. Device according to claim 1, wherein said capsule receiving pocket is provided with rim retention members for retaining a rim of a capsule received in said capsule receiving pocket in either one or the other of two alternative positions.

6. Device according to claim 5, wherein a first rim retention member arranged nearer to the rotor axis and a second rim retention member is arranged more distant from the rotor axis.

7. Device according to claim 1, wherein said at least two apertures are arranged in two approximately diametrically opposite positions around said rotor axis.

8. Device according to claim 1, wherein said two apertures are shaped and positioned so that a capsule positioned in the capsule receiving pocket with the rim facing the rotor axis will be released in a first one of said two apertures, and a capsule positioned in the capsule receiving pocket with the rim facing away from the rotor axis will be released in a second one of said two apertures.

9. Device according to claim 1, wherein said two apertures are arranged at different distances from the rotor axis.

10. Device according to claim 9, wherein said two apertures have different dimensions.

11. Device according to claim 10, wherein a first one of said two apertures is entirely located in the bottom wall of said container, and a second one of said two apertures extends along a side wall of said container.

12. Device according to claim 1, wherein said two apertures have a shape corresponding to a longitudinal section of the capsules.

13. Device according to claim 12, wherein said two apertures are located at the same distance from the rotor axis.

14. Device according to claim 12, wherein each aperture has a first edge and a second edge, different from one another, and wherein said two apertures have the same orientation with respect to the rotor axis.

15. Device according to claim 1, wherein said capsule collector comprises two capsule unloading ducts, each one being provided with a respective duct inlet located under a respective one of said two apertures, said capsule unloading ducts being arranged such that oriented capsules are released under the influence of gravity from said at least one capsule receiving pocket through either one or the other of said two apertures in the corresponding capsule unloading duct.

16. Device according to claim 15, wherein said capsule collector comprises at least one curved duct along which each capsule released from said container rotates so that said capsule exits the capsule collector rotated by 90° with respect to the position taken by the capsule in said capsule receiving pocket.

17. Device according to claim 16, wherein the capsule unloading ducts are arranged to unload the capsules in a capsule collecting channel.

18. A beverage producing machine comprising a beverage-preparing unit and a capsule orienting device according to claim 1.

19. Device according to claim 1, wherein the rotor has a conical upper surface.

* * * * *